United States Patent [19]
Oka

[11] Patent Number: 5,464,100
[45] Date of Patent: Nov. 7, 1995

[54] SORTING APPARATUS IN SOLID WASTE SORTING SYSTEM

[75] Inventor: Mitsuhiro Oka, Osaka, Japan

[73] Assignee: Okasan Corporation, Osaka, Japan

[21] Appl. No.: 139,183

[22] Filed: Oct. 19, 1993

[30] Foreign Application Priority Data

Oct. 20, 1992 [JP] Japan ................................ 4-280401

[51] Int. Cl.⁶ ........................................ B07B 9/00
[52] U.S. Cl. ............................ 209/31; 209/35; 209/38; 209/39; 209/137; 209/142; 209/930
[58] Field of Search ............................ 209/21, 30, 31, 209/34, 35, 38, 39, 44.2, 44.1, 44.4, 636, 639, 644, 674, 705, 136, 137, 142, 143, 146, 149, 215, 218, 225, 226, 930, 2

[56] References Cited

U.S. PATENT DOCUMENTS

| | | | |
|---|---|---|---|
| 3,738,483 | 6/1973 | MacKenzie | 209/44.1 |
| 4,778,061 | 10/1988 | Williams | 209/930 X |
| 5,263,591 | 11/1993 | Taormina et al. | 209/930 X |

FOREIGN PATENT DOCUMENTS 439701  8/1991  European Pat. Off. ................ 209/930

Primary Examiner—David H. Bollinger
Attorney, Agent, or Firm—Peter Jon Gluck; Morrison Law Firm

[57] ABSTRACT

A sorting apparatus for a solid waste sorting system has a first set of three belt conveyors, for conveying solid waste at a first speed, and a second set of three belt conveyors, each of the latter disposed with one end connected to the downstream end of a corresponding one of the first three belt conveyors, for conveying solid waste at a second speed which is greater than the first speed. The first three belt conveyors extend transversely into a feed-out path of a storage section in such a way that the conveyor lying successively furthest away from the storage section along the feed-out path is of successively longest upstream-end extension. The solid waste is sorted manually on the second set of three belt conveyors and is then supplied to a draft-sorting machine. The draft-sorting machine has a sloping surface onto which solid waste is dropped in a stream, a blower for blowing air diagonally upward through the stream of solid waste as it falls along the sloping surface, and distribution passages for guiding the solid waste sorted by the blower away along separate routes.

20 Claims, 7 Drawing Sheets

SORTING APPARATUS IN SOLID WASTE SORTING SYSTEM

TECHNICAL FIELD

This invention relates to waste sorting apparatus, and more particularly relates to waste sorting apparatus for a solid waste sorting system which has a supply section for supplying solid waste to sections of the system where sorting is carried out.

DESCRIPTION OF THE BACKGROUND

Solid waste which includes construction refuse and the like is sorted into different classes of material with the aim of environmental conservation by recovering and reusing recyclable materials. This sorting is carried out by waste processing plants equipped with solid waste sorting systems, and the following kinds of problem have been associated with the waste sorting system processes:

(1) Sorting is carried out both by hand and using various sorting machines such as vibration sifting machines, bucket screen machines, and incline sorting machines.

Although relatively large items such as large pieces of metal, corrugated cardboard, and waste plastic can be picked out by hand, small items, cannot be. Furthermore, small items cannot be sorted by bucket screen or incline sorting machines either.

Although vibration sifting machines can be used to separate out small pieces of waste, this too is unsatisfactory because pieces are separated out based only upon their maximum dimension. Sorting dimensionally is not effective, for example, in separating out chips of wood, or pieces of paper or plastic or the like, when mixed up with gravel and lumps of soil and cement.

(2) Solid waste sorting systems are provided with belt conveyors for transporting the solid waste, and the solid waste is sorted by hand as It moves along the conveyors.

However, when the solid waste is piled deeply on the belt conveyors, manual sorting is encumbered. On the other hand, if the solid waste is loaded thinly on the belt conveyors in order to facilitate manual sorting, the throughput rate at which the waste can be processed is reduced.

(3) Only one belt conveyor is provided next to the solid waste storage area; solid waste cannot be transported into the processing plant at a high throughput rate by just one belt conveyor. If the rate at which solid waste is transported into the plant cannot be Increased, the rate at which the waste is sorted cannot be increased.

OBJECTS AND SUMMARY OF THE INVENTION

One object of this invention is to improve the efficiency with which solid waste can be sorted.

Another object of this invention is to increase the operating efficiency of the waste sorting system as a whole.

In the present invention:

(1) A solid waste sorting apparatus devised as a solution to the first problem mentioned above comprises: a sloping surface, for receiving solid waste dropped onto it; a blower, for blowing air cross-stream through a stream of solid waste that has fallen along the sloping surface; and distribution passages, for carrying solid-waste sorted by the blower away along separate routes.

In this sorting apparatus, solid waste falling into the apparatus first hits the sloping surface. As a result, the speed at which the solid waste is falling is reduced. Then, the blower blows air through the slowed stream of solid waste, from one side of the stream to the other. This draft causes lighter, more buoyant components of the solid waste to be blown In the direction of the draft. As a result, the lighter components are separated from the heavier, less buoyant components of the solid waste. The solid waste thus sorted is guided away along separate routes by the distribution passages.

(2) A solid waste conveying apparatus devised as a solution to the second problem mentioned above comprises a first belt conveyor, capable of conveying solid waste at a first speed, and a second belt conveyor, disposed with one of its ends positioned underneath the downstream end of the first belt conveyor, capable of conveying solid waste at a second speed which is greater than the first speed.

With this conveying apparatus, even if solid waste is piled deeply on the first belt conveyor, the solid waste on the second belt conveyor can be kept to a depth suitable for sorting. As a result, sorting can be carried out both smoothly and at high solid waste throughput rates.

(3) A solid waste input structure devised as a solution to the third problem mentioned above comprises a storage section, for storing solid waste, and a conveyor section, for receiving solid waste fed out from the storage section and conveying it to a sorting process section. The conveyor section is provided with a plurality of conveyors having upstream ends extending transversely into a feed-out path of the storage section, such that those conveyors lying successively further away from the storage section along the feed-out path are of successively longer upstream-end extension.

With this solid waste input structure it is possible to feed solid waste laterally onto a number of conveyors at once. As a result, the efficiency with which solid waste is conveyed to the sorting section can be maximized.

These and other objects and advantages of the present invention should be clear from the detailed description of a preferred embodiment of tile invention that follows.

DETAILED DESCRIPTION OF THE PREFERRED EMBODIMENTS

Figure 1:
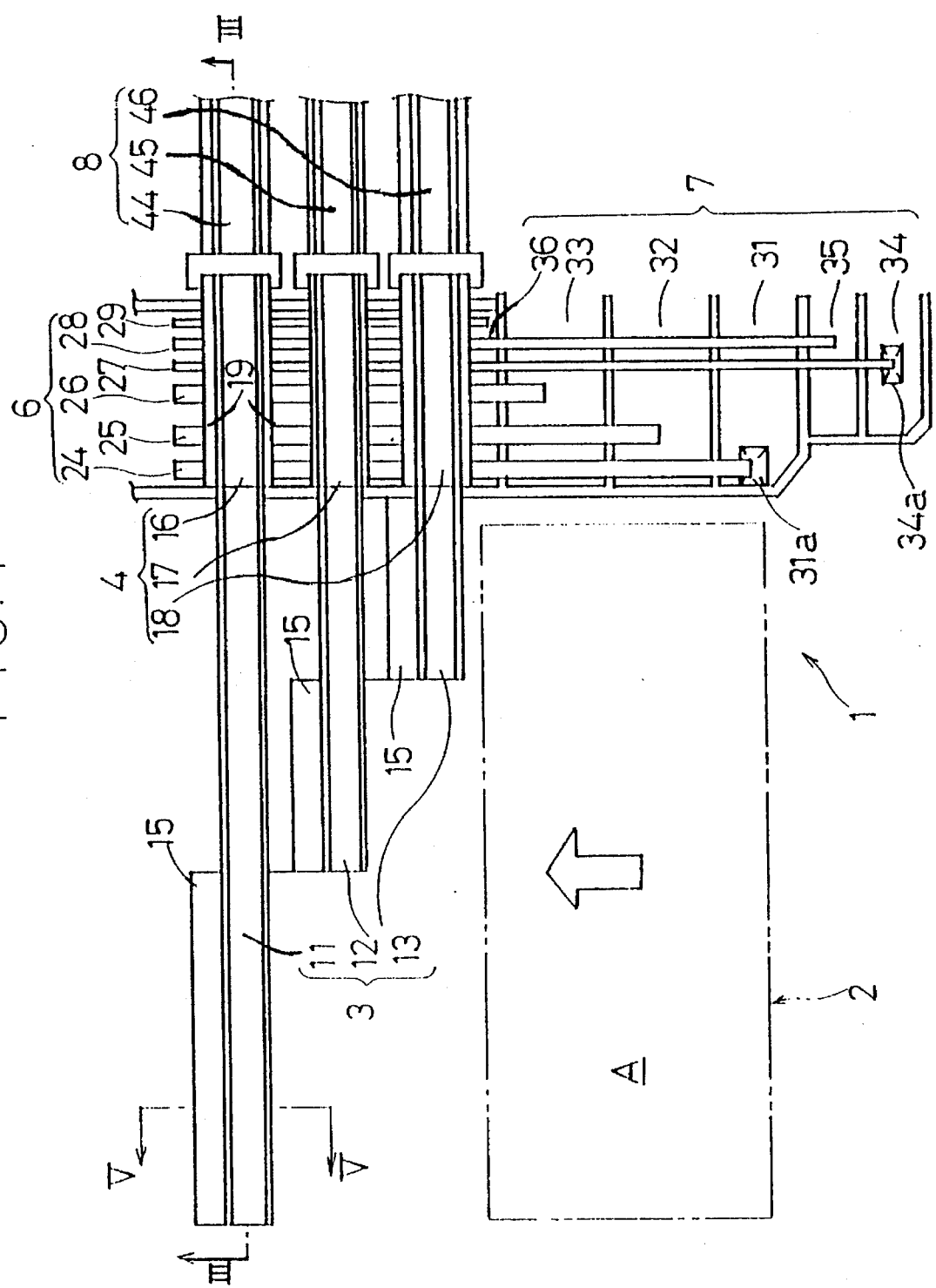
FIG. 1 Is a partial plan view of a construction waste processing plant according to a preferred embodiment of the present invention.
Figure 2:
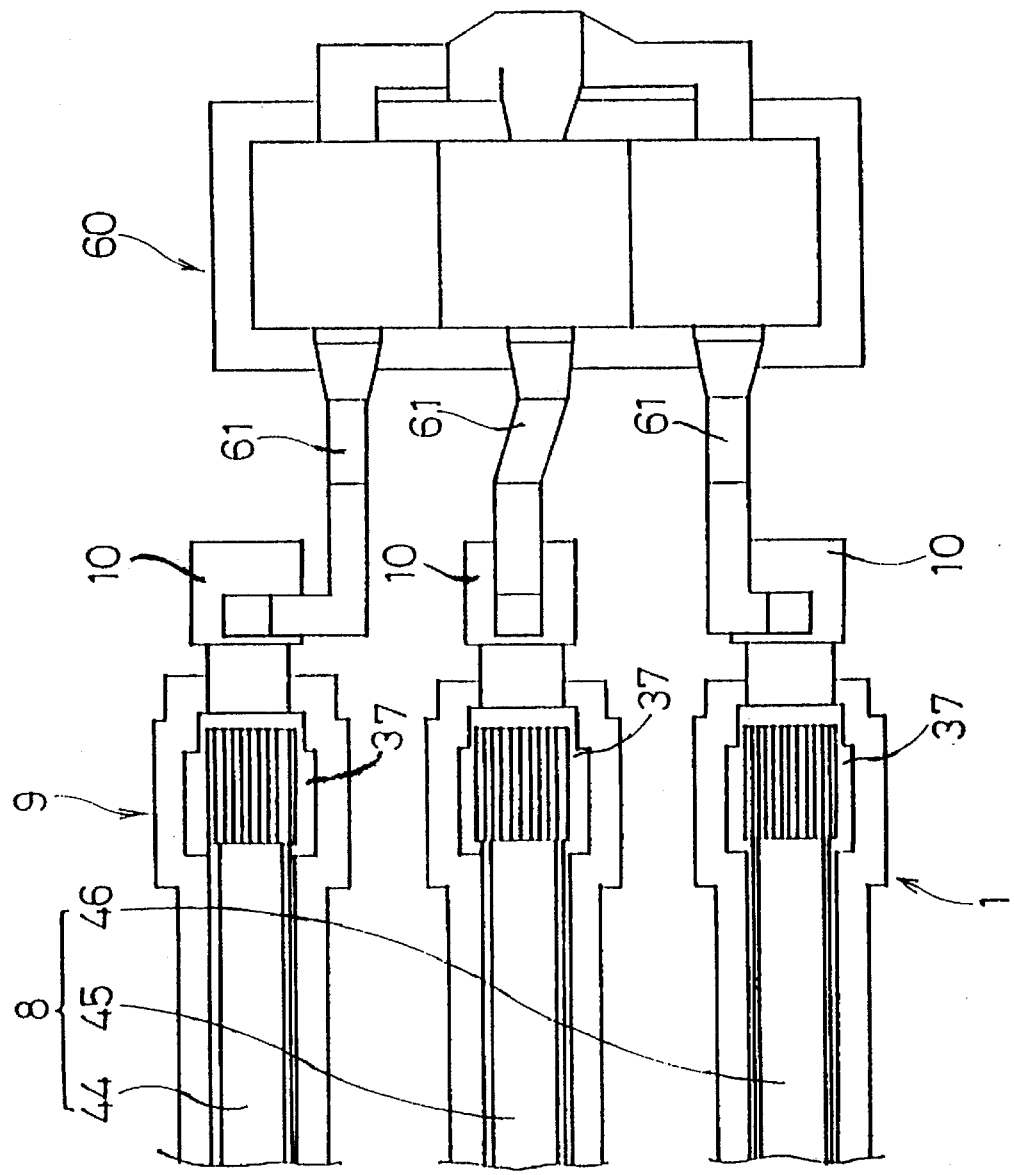
FIG. 2 is a partial plan view showing the remainder of the construction waste processing plant of FIG. 1.
Figure 3:
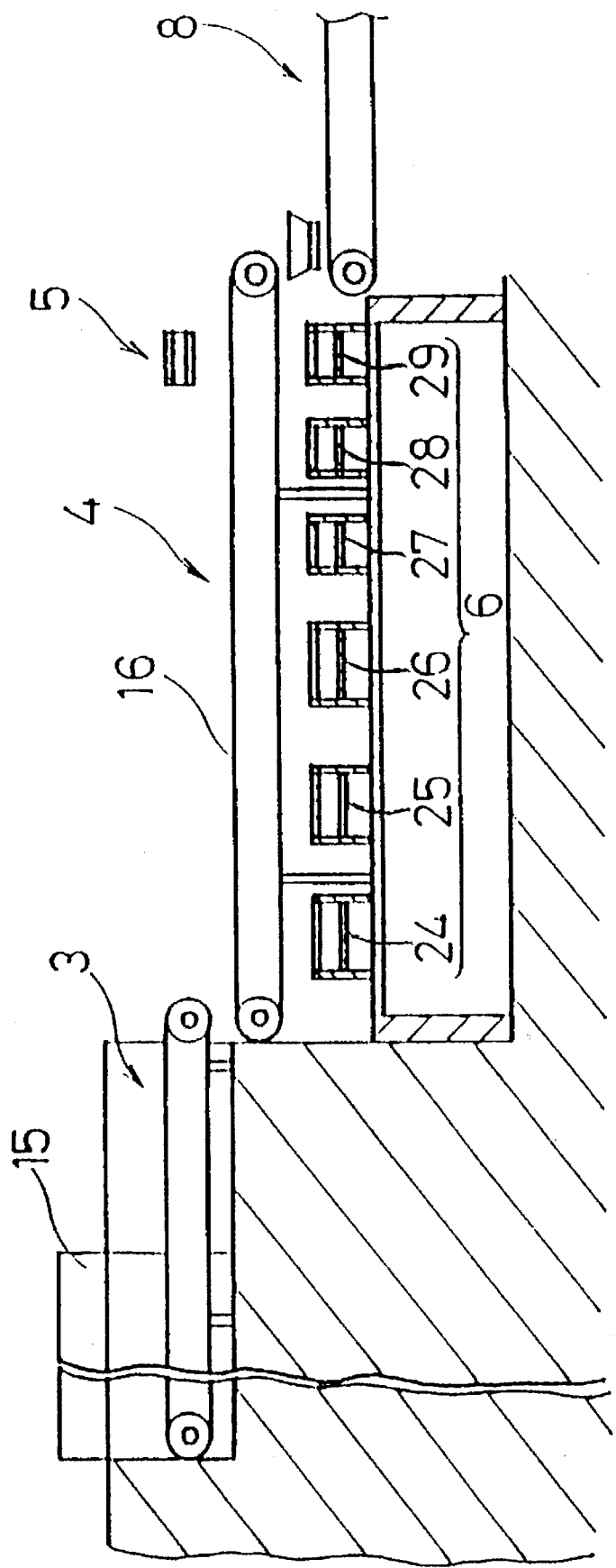
FIG. 3 is a sectional view taken along the line III—III of FIG. 1.

In FIGS. 1–4, a construction waste processing plant 1 according to a preferred embodiment of the present invention is shown to comprise a storage section 2, for storing solid waste consisting of construction waste materials or the like; a first conveyor section 3, for receiving solid waste fed out from the storage section 2; a second conveyor section 4, connected to the first conveyor section 3; a magnetic sorter 5, disposed above the downstream end of the second conveyor section 4; a third conveyor section 6, consisting of several conveyors disposed perpendicular to the second conveyor section 4; a pit section 7, for receiving sorted waste conveyed to it by the third conveyor section 6; a fourth conveyor section 8, disposed with its upstream end positioned beneath the downstream end of the second conveyor section 4; a sifting section 9, connected to the downstream end of the fourth conveyor section 8; and a draft-sorting machine 10, connected to the downstream end of the sifting section 9.

The storage section 2 is established on a generally flat ground surface on which solid waste A unloaded from a transport vehicle such as a dump truck can be stored in heaps. The solid waste A is pushed out of the store section in the direction indicated by the arrow in FIG. 1 (the feed-out direction) by a bulldozer or the like.

Figure 5:
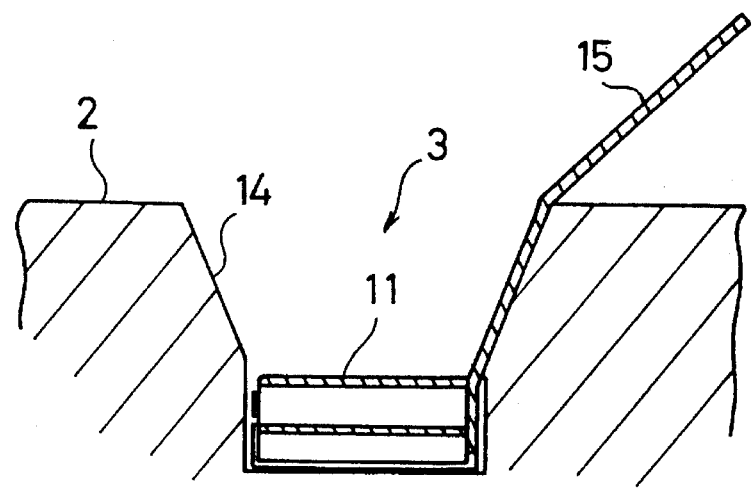
FIG. 5 is a sectional view taken along the line V—V of FIG. 1.

The first conveyor section 3 is disposed adjacent to the storage section 2, and the conveying direction of the conveyor section 3 (from left to right in the drawings) intersects with the feed-out direction of the storage section 2. This first conveyor section 3 consists of three belt conveyors 11, 12, and 13, each having an endless loop rubber belt. The belt conveyors 11, 12, and 13 lie horizontal and parallel to each other and, as shown in FIG. 5, are together disposed at the bottom of a channel 14 formed In the ground.

Each of the belt conveyors 11, 12, and 13 has a guide plate 15, mounted on the side of the belt conveyor that is farther from the storage section 2, for guiding solid waste fed out from the storage section 2 into the respective belt conveyor. The guide plates 15 extend upward along the side walls of the channels 14 and extend up above the storage section 2 ground level.

The further forward along the storage section 2 feed-out path one of the belt conveyors 11, 12, and 13 lies, the further that belt conveyor extends along the feed-out side of the storage section 2. That is, the upstream end of the belt conveyor 12 is positioned between the upstream end of the belt conveyor 11 and the second conveyor section 4, and the upstream end of the belt conveyor 13 is positioned between the upstream end of the belt conveyor 12 and the second conveyor section 4. Furthermore, as is shown clearly by FIG. 1, the guides 15 are mounted on the portions of the belt conveyors 11, 12, and 13 which project into the storage section 2 feed-out path.

Because this construction makes it possible for large quantities of solid waste fed out from the storage section 2 to be received laterally by the three belt conveyors 11, 12, and 13, the efficiency with which solid waste is conveyed to the second conveyor section 4 is maximized.

The second conveyor section 4 is disposed with its upstream end positioned beneath the downstream end of the first conveyor section 3. This second conveyor section has three belt conveyors 16, 17, and 18, disposed in parallel with each other and oriented horizontally. The belt conveyors 16, 17. and 18 each have an endless loop rubber belt, and, as seen from above, are disposed on extensions of the centerlines of the belt conveyors 11, 12, and 13 respectively.

The conveying speed of the belt conveyors 16, 17, and 18 is set so that it is greater than the conveying speed of the belt conveyors 11, 12, and 13. The conveying speed of the belt conveyors 11, 12, and 13 is set to 2.5 m/min for example, and the conveying speed of the belt conveyors 16, 17, and 18 is set to 8.0 m/min, for example. It is desirable that the conveying speed of the belt conveyors 16, 17, and 18 be more than twice the conveying speed of the belt conveyors 11, 12, and 13. These conveying speeds and their magnitudes relative to each other can be set and changed by means of a controller not shown in the drawings.

Because the conveying speed of the belt conveyors 16, 17, and 18 is greater than the conveying speed of the belt conveyors 11, 12, and 13, the layers of solid waste on the belt conveyors 16, 17, and 18 are thinner than the layers of solid waste on the belt conveyors 11, 12, and 13. Therefore, solid waste transported from the storage section 2 by the first conveyor section 3 is made to have a depth on the belt conveyors 16, 17, and 18 facilitating manual sorting.

Walkways 19 are provided flanking each of the belt conveyors 16, 17, and 18. Sorting workers stand on the walkways 19 in order to carry out manual sorting of the waste.

Figure 6:
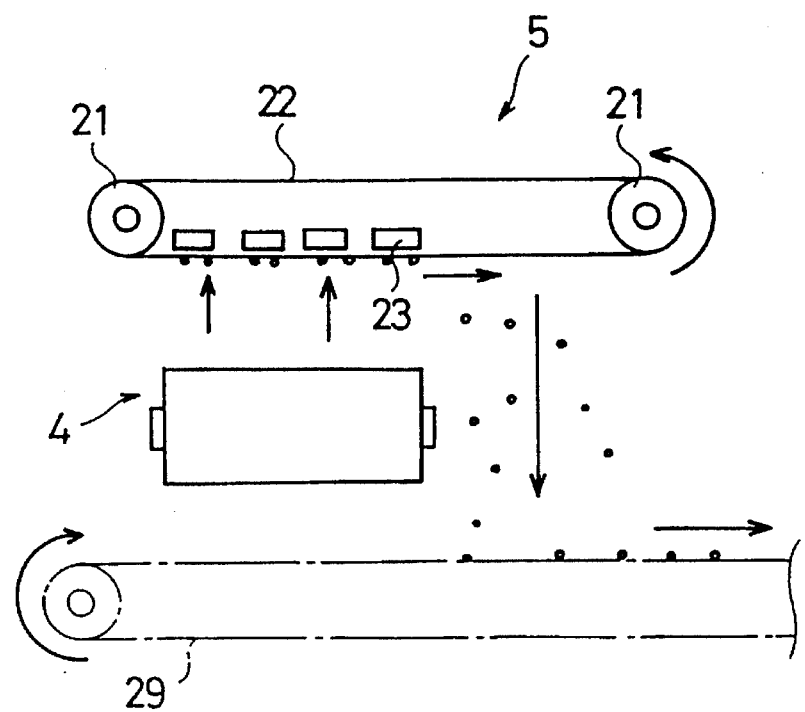
FIG. 6 is a schematic view Illustrating the construction of a magnetic sorting machine used in the plant of FIG. 1.

The magnetic sorting machine 5, as shown in FIG. 6, essentially consists of a pair of rollers 21, a thin film belt 22 running around the rollers 21, and several magnets 23 disposed between the rollers 21 and Just above the lower stretch of the thin film belt 23. The magnetic sorting machine 5 is disposed above the upstream end portions of the belt conveyors 16, 17, and 18, with a gap of approximately 50 cm being provided between the belt conveyors 16, 17, and 18 and the magnetic sorting machine 5. The belt 22 is disposed perpendicular to the belt conveyors 16, 17, and 18, and the downstream end portion of the belt 22 projects laterally beyond the belt conveyors 16, 17, and 18. There are no magnets 23 disposed above this projecting part of the belt 22.

The third conveyor section 6 is disposed at right angles to and beneath the second conveyor section 4. The upstream end portion of this third conveyor section 6 is positioned directly beneath the second conveyor section 4. The third conveyor section 6 has several belt conveyors 24–29, disposed parallel to each other and oriented horizontally. The belt conveyors 24–29 each have an endless loop rubber belt. The downstream ends of the belt conveyors 24–29 are positioned over disposal pits of a pit section 7.

Of the belt conveyors 24–29, belt conveyor 24 is for conveying waste plastic; belt conveyor 25 is for conveying relatively large items of leftover material; belt conveyor 26 is for conveying scrap; belt conveyor 27 is for conveying corrugated cardboard; belt conveyor 28 is for conveying relatively large combustibles; and belt conveyor 29 is for carrying metallic items picked out by the magnetic sorting machine 5.

The pit section 7 consists of a set of U-shaped disposal pits 31–36, separated from each other by partition walls. The downstream ends of the belt conveyors 24, 25, 26, 27, 28 and 29 are positioned over pits 31, 32, 33, 34, 35 and 36, respectively.

A pulverizer 31a for pulverizing the waste plastic is disposed in the waste plastic pit 31, and a compactor 34a for compacting the corrugated cardboard is disposed in the waste corrugated cardboard pit 34.

The fourth conveyor section 8 Is disposed below the second conveyor section 4, on an extension of the centerline of the second conveyor section 4. The upstream end of this fourth conveyor section 8 is positioned directly beneath the downstream end of the second conveyor section 4. This fourth conveyor section 8 consists of three belt conveyors 44, 45, and 46, disposed parallel to each other and oriented horizontally. The belt conveyors 44, 45, and 46 each have a endless loop rubber belt, and the sifting section 9 is disposed at their downstream common ends.

The sifting section 9 consists of three vibration sifters 37 having comb-form riddles, a pair of belt conveyors 38 and 39 for transporting the material that passes through the riddles, and another vibration sifter 43 disposed at the downstream end of the belt conveyor 39. The sifter 43 has a gauze-form sieve.

Figure 4:
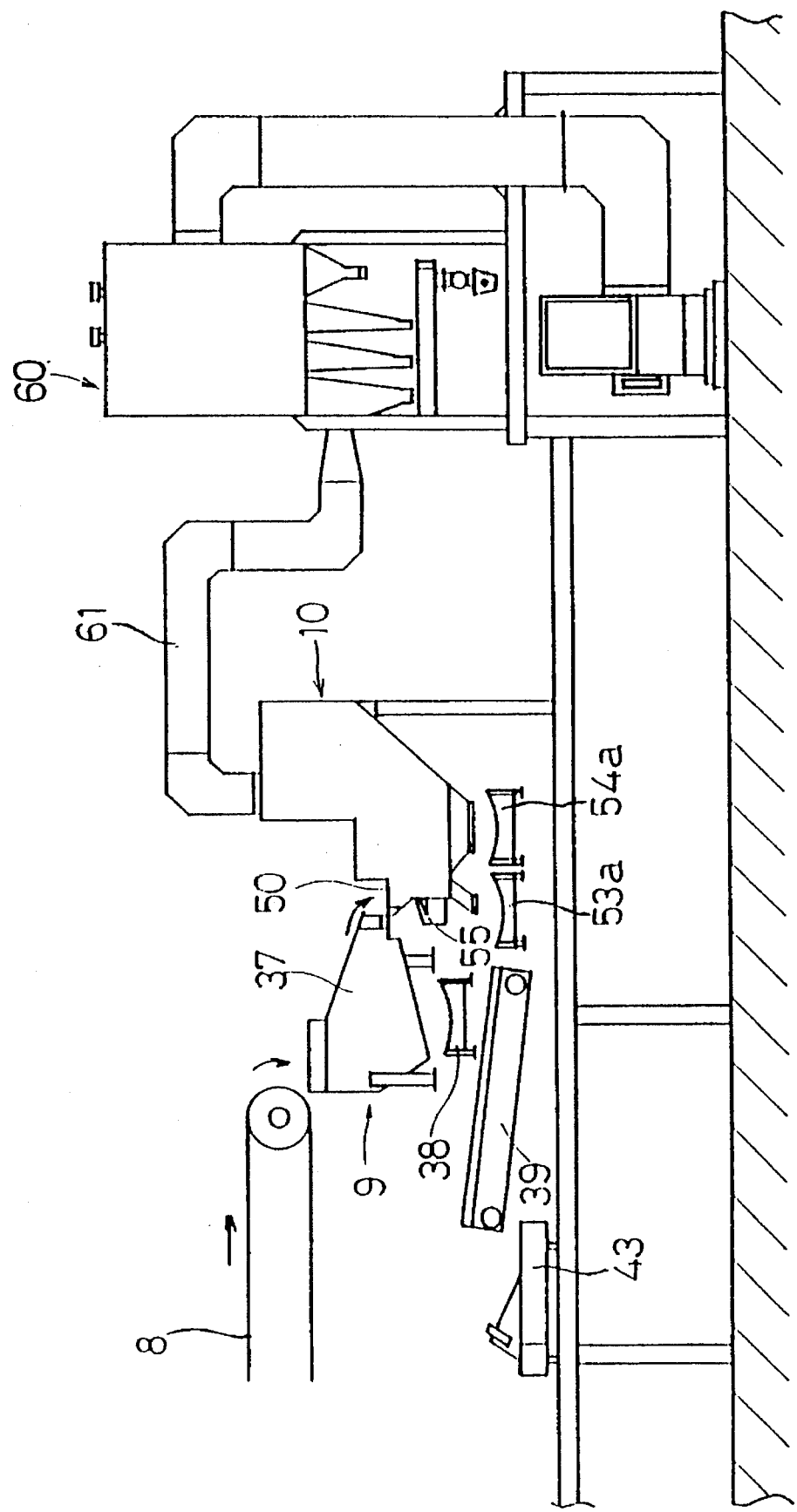
FIG. 4 is a side elevational view of the part of the plant shown in FIG. 2.
Figure 7:
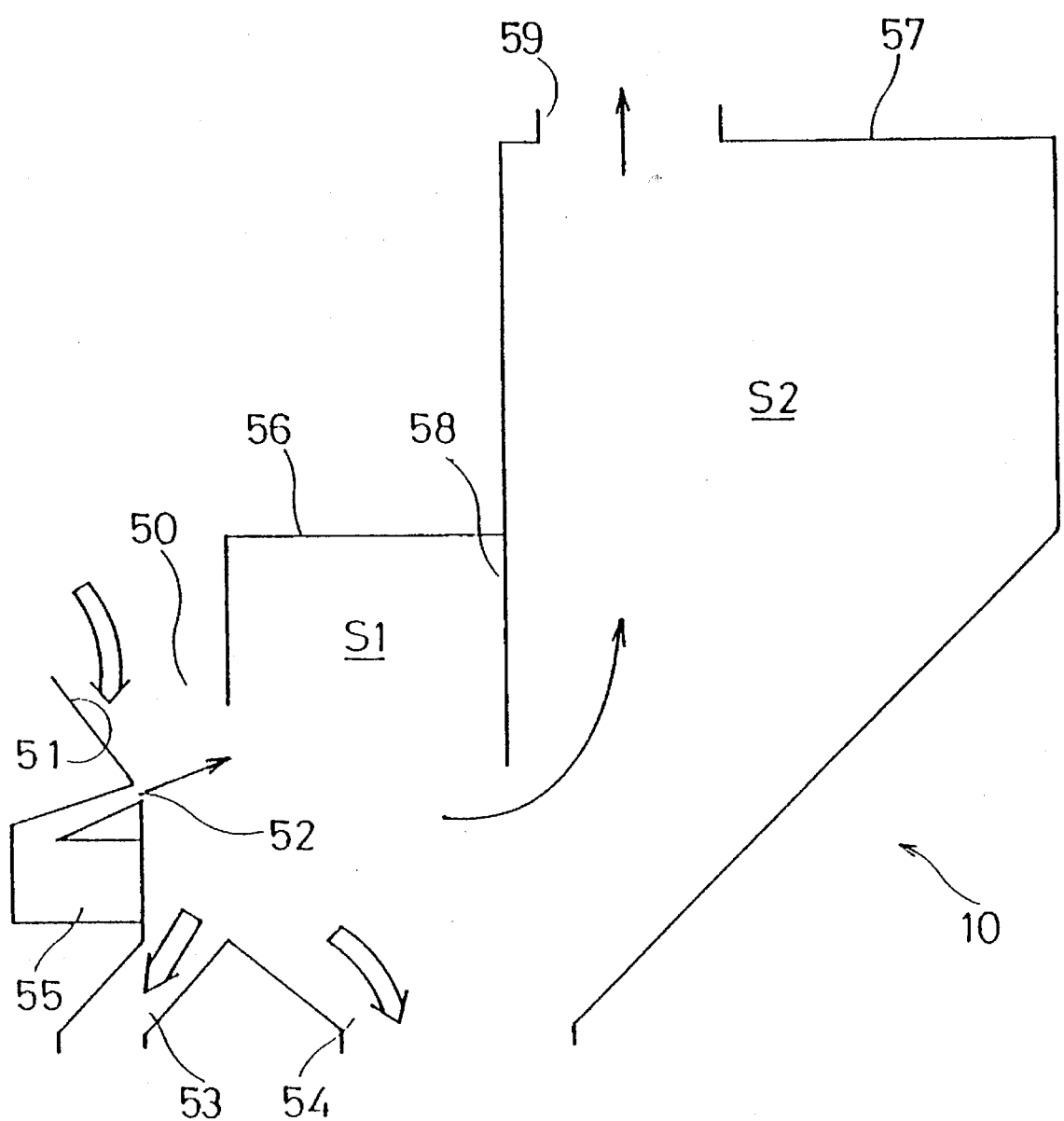
FIG. 7 is a schematic vertical section view illustrating the construction of a draft-sorting machine used in the plant of FIG. 1.

Each of three draft-sorting machines 10, for sorting out relatively light objects, as illustrated in FIG. 7, has an intake opening 50 for receiving solid waste from the sifting section 9 (FIG. 4), a sloping surface 51 which extends downward from the intake opening 50, a draft opening 52 disposed at the lower end of the sloping surface 51, and a pair of diverging distribution passages 53 and 54 disposed below the draft opening 52. The distribution passage 53 is for relatively heavier waste components, and an exit opening at the downstream end thereof is positioned above a belt conveyor 53a, as shown in FIG. 4. The distribution passage 54 is for relatively lighter waste components, and an exit opening at the downstream end of this passage is positioned above a belt conveyor 54a. The solid waste distributed to the belt conveyors 53a and 54a is transported to designated pits (not shown in the drawings) and stored there.

In each draft-sorting machine, as FIG. 7 shows, the discharge opening of a blower 55 is connected to a draft opening 52, and compressed air from the blower 55 is blown diagonally upward through the draft opening 52. The direction in which the compressed air is blown (indicated by the arrow shown extending from the draft opening 52 in FIG. 7) is 50°–60° from the vertical.

A first chamber S1 dellned by a first casing 56 is provided in the path of the compressed air, on the opposite side of the solid waste stream from the blower opening 52. A second chamber S2 deflned by a second casing 57 is provided in the path along which air discharges from the chamber S1. A blocking plate 58 projects downward between the chamber S1 and the chamber S2. The chamber S2 is substantially larger than the chamber S1, and as a result of this the speed of the air flowing in the chamber S2 is lower than the speed of the air flowing in the chamber S1.

An air discharge opening 59 is provided at the top of the second casing 57. As shown in FIG. 4, the end of an intake duct 61 of a dust collector apparatus 60 is connected to the air discharge opening 59. The dust collector apparatus 60 is a device for removing fine particles from the air exhausted from the draft-sorting machine 10.

Next, solid waste sorting operations of the construction waste processing plant described above will be explained.

Initially, solid waste A is unloaded from a dump truck or the like into the storage section 2. The unloaded solid waste is fed into the first conveyor section 3 by a bulldozer or the like. During tills process, because the upstream ends of the belt conveyors 11, 12, and 13 are provided with the guide plates 15, excess solid waste pushed into the channels 14 is prevented from overflowing. Moreover, even when so much solid waste is piled on at one time that it reaches tile upper portions of the guide plates 15, the excess solid waste is nonetheless steadily guided onto the belt conveyors 11, 12, and 13. This allows for an increase in the amount of solid waste fed onto the first conveyor section 3 each time the bulldozer advances. As a result, the belt conveyors 11, 12, and 13 can convey solid waste with increased efficiency, maximizing tile amount of solid waste they can receive.

The solid waste fed onto the belt conveyors 11, 12, and 13 is conveyed to the second conveyor section 4 at a speed of 2.5 m/min in this case. The solid waste falls from the belt conveyors 11, 12, and 13 onto the second conveyor section belt conveyors 16, 17, and 18. The conveying speed of the belt conveyors 16, 17, and 18 is in this case set at 8.0 m/min. and therefore, even if solid waste has been loaded onto the first conveyor section in deep piles, on the belt conveyors 16, 17, and 18 the solid waste will become drawn out to a depth suitable for manual sorting. Consequently, sorting workers standing on the walkways 19 can perform manual sorting with ease.

Solid waste separated out by manual sorting is thrown down onto the belt conveyors 24–29 of the third conveyor section 6 disposed below, and is distributed to the respective disposal pits 31–36 of the pit section 7. Because the second conveyor section 4 is disposed above and across the third conveyor section 6, manual sorting work is facilitated.

At the downstream end of the second conveyor section 4, metallic objects are picked out of the solid waste by the magnetic sorter 5 overhead. The metallic fragments are pulled up against the lower surface of the thin film belt 22 by the magnets 23, and subsequently drop down;onto the conveyor 29. Metallic objects that have dropped onto the belt conveyor 29 are carried to disposal pit 36.

Solid waste that has passed under the magnetic sorter 5 is carried by the fourth conveyor sections to the vibration sifters 37. There, the solid waste is dropped onto the comb-form riddles, and solid waste which passes through the riddles moves along the belt conveyors 38 and 39 and is dropped into the second vibration sifter 43.

Solid waste which does not pass through the riddles of the vibration sifters 37 is fed into the draft-sorting machines 10 through the intake opening 50. The solid waste fed into the draft-sorting machines 10 first hits the sloping surface 51 and consequently loses speed. Then, the blower 55 blows air diagonally upward through the solid waste as it falls off the end of the sloping surface 51. Because the draft is diagonal and upward, lighter, more buoyant waste components are slowed by the upward vector component of the draft and are blown out of the solid waste stream into the chamber S1 by the horizontal vector component of the draft. Heavier, less buoyant waste components, simply drop into the distribution passage 53 and are guided to the belt conveyor 53a.

The lighter waste components which have been blown into the first chamber S1 are prevented from continuing into the second chamber S2 by the blocking plate 58, and fall through the distribution passage 54 onto the belt conveyor 54a. The draft air in the first chamber S1 passes around the bottom of the blocking plate 58 and into the second chamber S2. Because the second chamber S2 is larger than the first chamber S1, the air loses speed when it enters the second chamber S2, and large diameter particles of dust carried in the air fall out. This dust falls through the distribution passage 54 onto the belt conveyor 54a. The air, with its dust content thus reduced, then passes out through the discharge opening 59 and is supplied through the duct 61 to the dust collector apparatus 60. The dust collector apparatus 60 further purges the exhausted draft air of dust.

In this preferred embodiment, because the solid waste fed into the draft-sorting machines 10 is first slowed down by the sloping surface 51 and is then sorted by the blower 55 blowing air diagonally upward, high sorting efficiency is achieved.

Figure 8:
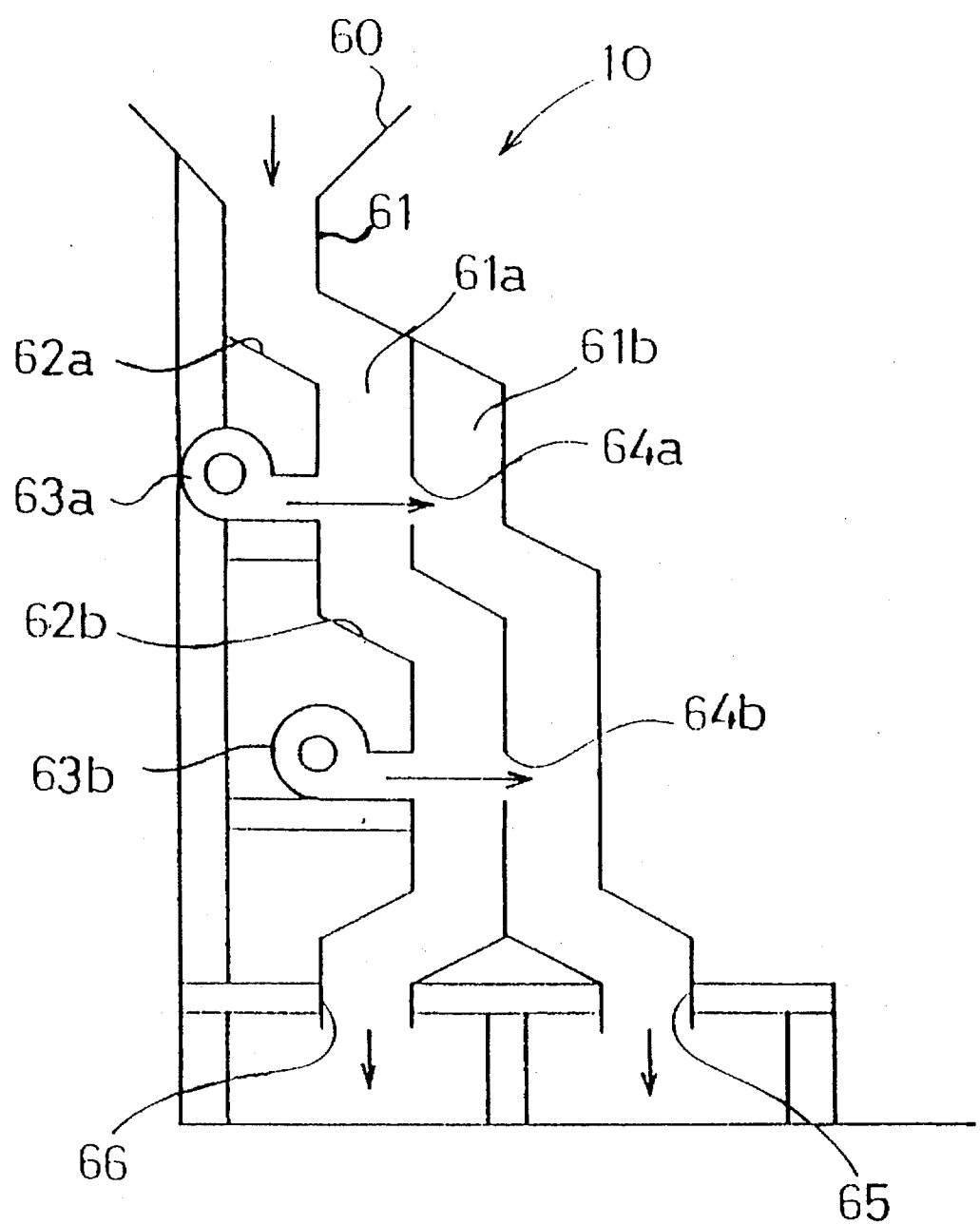
FIG. 8 is a schematic vertical section view showing a draft-sorting machine having an alternative construction.

Alternative Embodiments (a) The draft-sorting machine 10 can be constructed as diagramed in FIG. 8.

This draft-sorting machine 10 consists of a tapered intake opening 60 at the top, a duct 61 which extends downward from the intake opening 60, and a pair of blowers 63a and 63b for blowing air Into the duct 61. The duct 61 is divided by a partition wall into a heavy waste passage duct 61a and a light waste passage duct 61b, and provided in the partition wall are draft openings 64a and 64b opposite the blowers 63a and 63b, respectively.

The blowers 63a, 63b blow air roughly horizontally toward the draft openings 64a and 64b. Stepped sections 62a and 62b for slowing the fall of the solid waste and promoting its separation are provided in the heavy waste passage duct 61a. Formed onto the bottom ends of the heavy waste passage duct 61a and the light waste passage duct 61b, respectively, are an incombustible waste outlet 66 for discharging incombustible waste, and a combustible waste outlet 65 for discharging combustible waste.

Waste fed in through the intake opening 60 is guided down the duct 61a and hits the stepped section 62a. At this point, combustible materials in the waste, such as plastic, paper and wood, are slowed down and to some extent become separated from rest of the waste. Then, the waste continues down the duct 61a and passes in front of the blower 63a. At this point, combustibles in the waste, which are readily buoyant, are blown through the draft opening 64a into the adjacent duct 61b. The waste then continues down the duct 61a and is sorted again in the same way by the stepped section 62b and the blower 63b. Accordingly, waste is sorted as that emerging from the combustible waste outlet 65 and that from the Incombustible waste outlet 66.

The combustibles which emerge from the combustible waste outlet 65 are disposed of using an incinerator or the like. The incombustibles which emerge from the incombustible waste outlet 66 are sorted further by a magnetic sorter. Waste plastic items are disposed of using a waste plastic compacting and hardening apparatus or the like.

(b) The vibration sifters 37 can be disposed between the second conveyor section 4 and the fourth conveyor section 8.

(c) The present invention can be applied to a system having two conveyor lines, or four or more conveyor lines, Instead of the three conveyor lines of the above-described embodiment.

Various changes can be made without exceeding the scope of the invention. The above description of a preferred embodiment of the invention is presented for the purposes of exemplification and explanation only, and it is not intended that the invention prescribed by the scope of the claims and equivalent scopes be limited to the construction detailed here.

What is claimed is:

1. Apparatus for solid waste input having a solid waste sorting section, comprising, in combination:

a storage section having a solid waste feed-out path, for removably storing solid waste; and a conveyor section receiving solid waste removed from said storage section, for conveying the removed solid waste to the sorting section; said conveyor section including a plurality of waste transport conveyors having upstream ends extending transversely into the solid waste feed-out path of said storage section, wherein waste transport conveyors lying successively further away from said storage section along said feed-out path are of successively longer upstream-end extension.

2. Apparatus according to claim 1, wherein said solid waste sorting section is located downstream from said storage section, said solid waste sorting section further comprising:

a sloping surface, for receiving a dropping stream of solid waste;

sorting blower means for blowing an air cross-stream through the stream of solid waste dropping along said sloping surface, for sorting by relative buoyancy components of the solid waste; and distribution passages, for distributing the solid waste components sorted by said sorting blower along separate routes.

3. Apparatus according to claim 2, wherein said sorting blower means blows air in a draft direction diagonally upward over said distribution passages.

4. Apparatus according to claim 3, wherein said draft direction is in a range of from about 50° to about 60° from vertical.

5. Apparatus according to claim 2, further comprising:

a first casing enclosing a first space adjacent said sorting blower means; and a second casing enclosing a second space larger than the first space and located forward of the first space in said draft direction.

6. Apparatus according to claim 5, further comprising a dust collector apparatus superiorly connected to said second casing.

7. Apparatus according to claim 6, further comprising a plurality of waste transport conveyors disposed beneath said distribution passages.

8. Apparatus according claim 1, wherein said conveyor section further includes:

a first belt conveyor, in said conveyor section, for conveying a stream of solid waste at a first conveyance rate; and a second belt conveyor having one end connected to a downstream end of the first belt conveyor, for conveying solid waste at a second conveyance rate greater than the first conveyance rate.

9. Apparatus according to claim 8, further comprising a third belt conveyor disposed transverse to said second belt conveyor.

10. Apparatus according to claim 9, further comprising a pit section receiving a downstream end of said third belt conveyor.

11. Apparatus according to claim 8, wherein the second conveyance rate of said second belt conveyor is more than twice the first conveyance rate of said first belt conveyor.

12. Apparatus according to claim 8, further comprising a waste sifting section disposed at a downstream end of the second belt conveyor.

13. Apparatus for conveying solid waste according to claim 12, comprising:

a waste sorting section disposed downstream of said waste sifting section.

14. Apparatus for conveying solid waste according to claim 13, wherein said waste sorting section further comprises:

a sloping surface, for receiving a dropping stream of solid waste;

sorting blower means for blowing an air cross-stream through the stream of solid waste dropping along said sloping surface, for sorting by relative buoyancy components of the solid waste; and distribution passages, for distributing the solid waste components sorted by said sorting blower along separate routes.

15. Apparatus for conveying solid waste according to claim 14, wherein said sorting blower means blows air in a draft direction diagonally upward over said distribution passages.

16. Apparatus according to claim 1, further comprising:
   a plurality of waste transport guide plates, each disposed facing said storage section across an associated one of said waste transport conveyors, for guiding the solid waste into said waste transport conveyors.

17. Apparatus according to claim 16, wherein said waste transport guide plates are mounted along portions of the waste transport conveyor upstream ends extending transversely into the solid waste feed-out path.

18. Apparatus according to claim 17, further comprising:
   waste-sorting conveyors for a waste sorting process, disposed downstream of said waste transport conveyors.

19. Apparatus according to claim 18, wherein a conveyance rate of said waste-sorting conveyors is greater than a conveyance rate of said waste transport conveyors.

20. Apparatus according to claim 19, further comprising:
   a waste sifting section disposed at a downstream end of said waste-sorting conveyors; and
   a waste sorting section disposed downstream of said waste sifting section.

* * * * *